United States Patent
Levine et al.

(10) Patent No.: US 10,414,595 B2
(45) Date of Patent: Sep. 17, 2019

(54) RETURN CHAIN DRIVE AND RELATED METHODS

(71) Applicant: Cannon Equipment LLC, Cannon Falls, MN (US)

(72) Inventors: Douglas Levine, Inver Grove Heights, MN (US); Mark R. Rosa, Inver Grove Heights, MN (US)

(73) Assignee: Cannon Equipment LLC, Cannon Falls, MN (US)

( * ) Notice: Subject to any disclaimer, the term of this patent is extended or adjusted under 35 U.S.C. 154(b) by 0 days.

(21) Appl. No.: 15/782,580

(22) Filed: Oct. 12, 2017

(65) Prior Publication Data
US 2018/0105365 A1  Apr. 19, 2018

Related U.S. Application Data

(60) Provisional application No. 62/409,464, filed on Oct. 18, 2016.

(51) Int. Cl.
*B65G 23/34* (2006.01)
*B65G 23/06* (2006.01)
(Continued)

(52) U.S. Cl.
CPC .............. *B65G 23/34* (2013.01); *B65G 17/08* (2013.01); *B65G 23/06* (2013.01); *B65G 23/22* (2013.01);
(Continued)

(58) Field of Classification Search
CPC ........ B65G 15/10; B65G 15/12; B65G 23/04; B65G 23/06
(Continued)

(56) References Cited

U.S. PATENT DOCUMENTS 2,260,587 A * 10/1941 Shields ................ B65G 15/105
198/303
2,361,131 A * 10/1944 Smith .................... A01D 17/10
198/834
(Continued)

FOREIGN PATENT DOCUMENTS

CH      0656594      7/1986
DE      0953596     12/1956
(Continued)

*Primary Examiner* — James R Bidwell
(74) *Attorney, Agent, or Firm* — Andrus Intellectual Property Law, LLP

(57) ABSTRACT

Various continuous chain conveyors, parts for same (e.g., chain guides, chain drives, etc.), packaging and handling equipment and systems and related methods are disclosed herein. In one form, a chain conveyor comprising a primary continuous chain having a first portion configured to carry objects along a path and a return portion, a motor operably coupled to the primary continuous chain so as to induce movement of the chain, a first sprocket engaging the return portion of the primary continuous chain, wherein movement of the return portion causes the first sprocket to rotate, a second sprocket coupled to the first sprocket by a drive shaft, wherein rotation of the first sprocket causes the second sprocket to rotate, and an auxiliary chain operably coupled to the second sprocket such that rotation of the second sprocket causes movement of the auxiliary chain.

11 Claims, 9 Drawing Sheets

(51) Int. Cl.
*B65G 23/44* (2006.01)
*B65G 17/08* (2006.01)
*B65G 23/22* (2006.01)
*B65G 23/32* (2006.01)
B65G 47/34 (2006.01)
B65B 35/24 (2006.01)
B65G 1/04 (2006.01)
B65B 65/00 (2006.01)

(52) U.S. Cl.
CPC .............. *B65G 23/32* (2013.01); *B65B 35/24* (2013.01); *B65B 65/003* (2013.01); *B65G 1/04* (2013.01); *B65G 23/44* (2013.01); *B65G 47/34* (2013.01)

(58) Field of Classification Search
USPC .................. 198/817, 832, 834, 835, 841
See application file for complete search history.

(56) References Cited

U.S. PATENT DOCUMENTS

| | | | | |
|---|---|---|---|---|
| 2,491,255 A * | 12/1949 | Hilding | ............... | B65G 21/14 198/812 |
| 2,529,777 A | 11/1950 | McInnis | | |
| 2,720,963 A | 10/1955 | Stanley | | |
| 2,768,732 A * | 10/1956 | Muhlenbruch | ........ | B65G 21/14 198/633 |
| 2,950,815 A * | 8/1960 | Oberg | ............... | B21C 33/00 198/607 |
| 2,975,885 A * | 3/1961 | Grundelman | .......... | B65H 29/16 198/493 |
| 3,116,824 A * | 1/1964 | Stram | ............... | A21C 15/00 198/817 |
| 3,486,609 A | 12/1969 | Rogers | | |
| 3,512,629 A | 5/1970 | Torrance | | |
| 3,522,772 A | 8/1970 | Hunt | | |
| 3,556,288 A | 1/1971 | Assauer | | |
| 3,571,892 A | 3/1971 | Levy | | |
| 3,788,460 A | 1/1974 | Messersmith | | |
| 3,807,550 A | 4/1974 | Taylor | | |
| 3,934,707 A | 1/1976 | Bowman | | |
| 4,037,714 A | 7/1977 | Koepke | | |
| 4,075,949 A | 2/1978 | Davis | | |
| 4,142,625 A * | 3/1979 | Bourgeois | ............... | B65G 37/00 198/570 |
| 4,238,026 A | 12/1980 | Benson | | |
| 4,282,970 A | 8/1981 | Smock | | |
| 4,484,676 A | 11/1984 | Plumridge | | |
| 4,569,435 A | 2/1986 | McGovney | | |
| 4,612,861 A | 9/1986 | Lindquist | | |
| 4,778,044 A * | 10/1988 | Kondo | ............... | B23D 47/042 198/456 |
| 4,872,548 A | 10/1989 | Masuda | | |
| 5,042,392 A | 8/1991 | Brethorst | | |
| 5,115,907 A | 5/1992 | Pomara, Jr. | | |
| 5,195,630 A | 3/1993 | Donovan | | |
| 5,271,334 A | 12/1993 | Sweet | | |
| 5,320,212 A | 6/1994 | McIntosh | | |
| 5,381,888 A * | 1/1995 | Benson | ............... | B65G 23/42 198/460.1 |
| 5,437,537 A | 8/1995 | Sweet | | |
| 5,927,053 A | 7/1999 | Donovan | | |
| 6,056,496 A | 5/2000 | Myers | | |
| 6,481,567 B2 * | 11/2002 | Layne | ............... | B65G 23/10 198/834 |
| 6,572,326 B2 | 6/2003 | Myers | | |
| 2002/0108840 A1* | 8/2002 | Layne | ............... | B65G 21/06 198/832 |
| 2015/0306714 A1 | 10/2015 | Rahman | | |

FOREIGN PATENT DOCUMENTS

| | | |
|---|---|---|
| FR | 2594099 | 8/1987 |
| GB | 0639003 | 6/1950 |
| JP | 5772513 A | 5/1982 |
| SU | 1229141 | 5/1986 |
| SU | 1263592 | 10/1986 |

* cited by examiner

RETURN CHAIN DRIVE AND RELATED METHODS

CROSS-REFERENCE TO RELATED APPLICATION

This application claims the benefit of U.S. Provisional Application No. 62/409,464, filed Oct. 18, 2016, which is incorporated herein by reference in its entirety.

FIELD

This invention relates generally to continuous chain conveyors and parts for same and, more particularly, to chain drives for powering other mechanisms including but not limited to a chain drive that uses a returning chain to power an assist chain or chains for short sections of the conveyor system.

BACKGROUND

Continuous chain conveyors are used in a number of industries to move items along a set path. Continuous chain conveyors comprise one or more chains driven by one or more motors. Crates, cases, or other objects ride along the top of the chains in order to be transported. The chains are continuous loops, generally with the chain returning to the motor below the surface on which the objects ride. An example of a continuous chain conveyor is disclosed in U.S. Pat. No. 5,381,888 which is incorporated by reference herein.

Conventional continuous chain conveyors utilize numerous chain drives comprising motors, drive shafts, gear boxes and sprockets to run different portions of the continuous chain conveyor or others components or mechanisms. For example, at some points along a conveyor path objects might be more prone to becoming wedged or stuck (e.g., dead zones, etc.) and, thus, need further assistance to keep the conveyor moving product steadily and/or smoothly. These points or dead zones often occur at transitions where additional objects are loaded, at unions of adjacent pieces of track or where product is transitioning from one continuous chain conveyor section to another. To resolve this problem, conventional systems typically add an additional chain to that short expanse, such as a center chain, and an accompanying chain drive with motor, drive shaft, gear box and sprocket. These added components add to the expense of the chain conveyor system and result in a less efficient machine or system.

Accordingly, it has been determined that the need exists for an improved chain drive, continuous chain conveyor, parts for same, and methods relating to same.

BRIEF DESCRIPTION OF THE FIGURES

Embodiments of the invention are illustrated in the figures of the accompanying drawings in which.

Figure 1A:
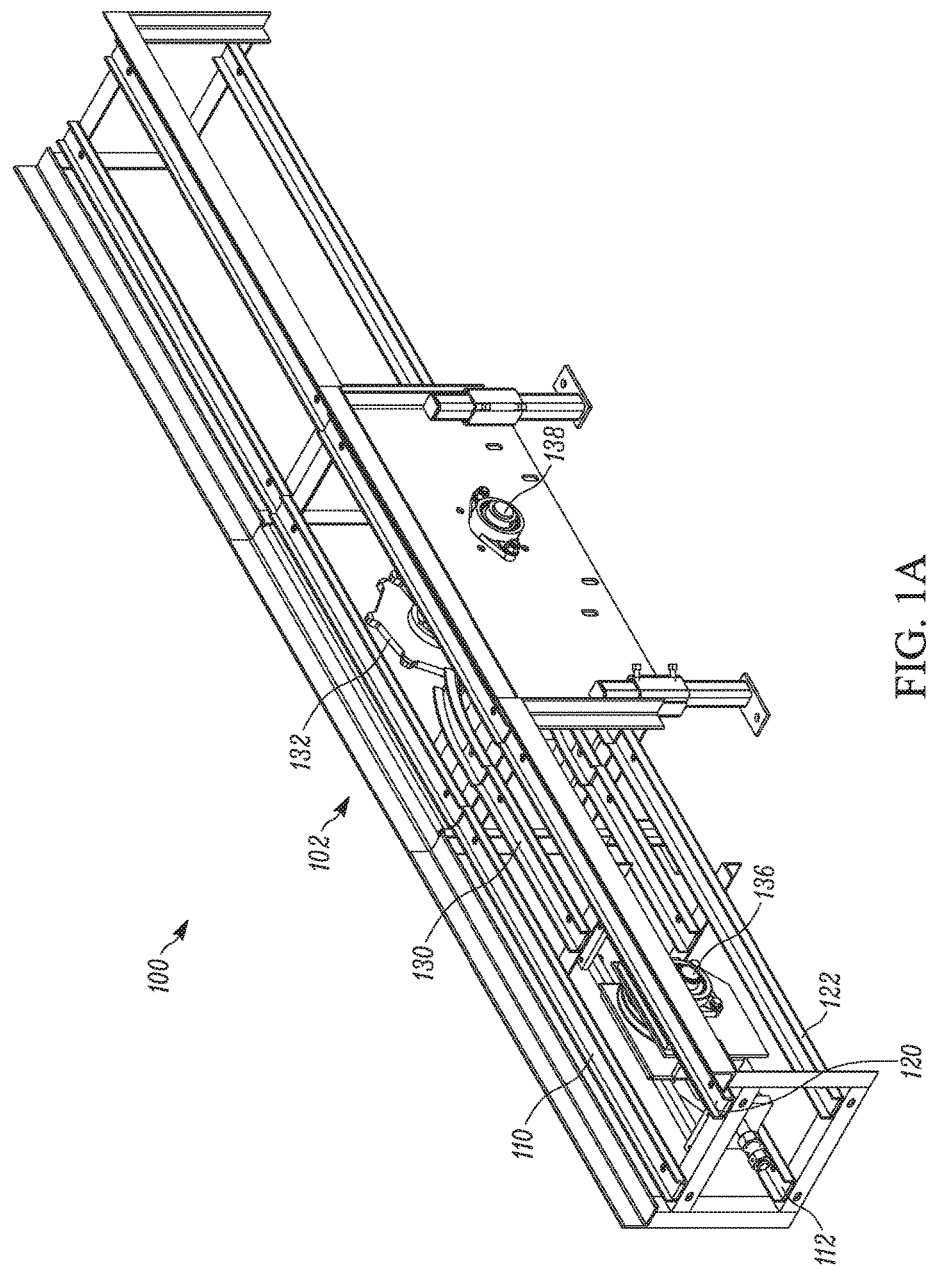
FIG. 1A is a top perspective view (or perspective view taken from above) of a chain conveyor section or mechanism according to a first embodiment.
Figure 1B:
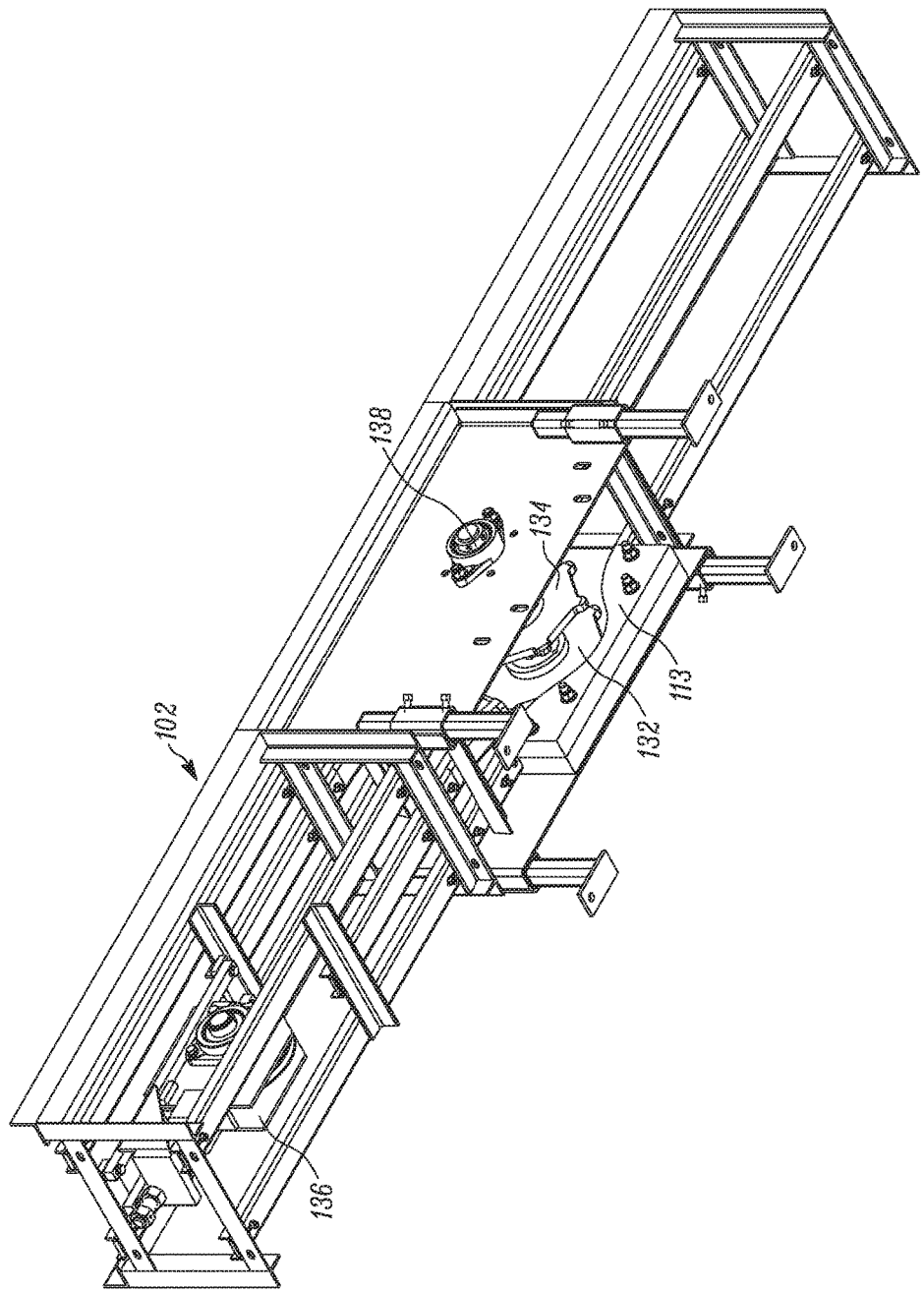
FIG. 1B is a bottom perspective view (or perspective view taken from below) of the chain conveyor section or mechanism of FIG. 1A.
Figure 1C:
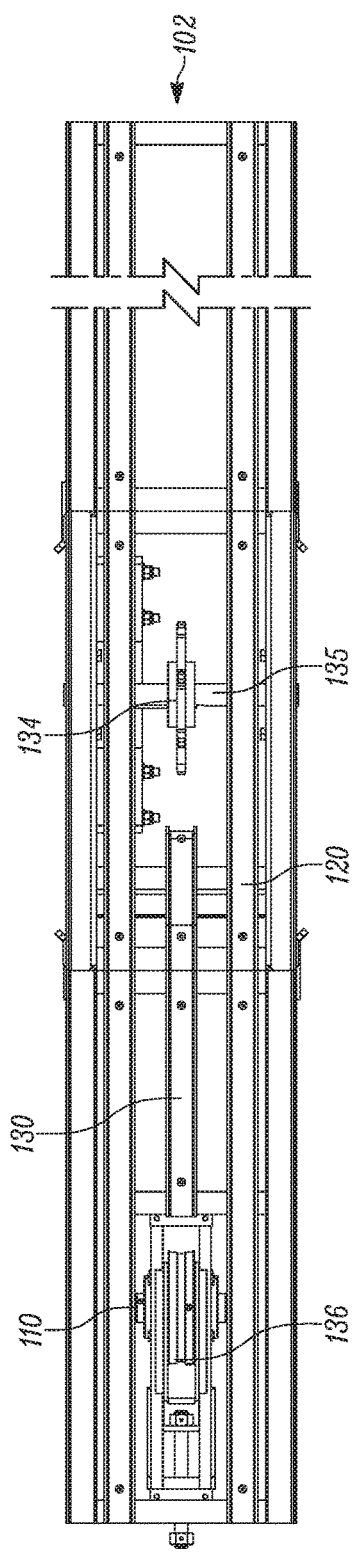
FIG. 1C is a top plan view of the chain conveyor section or mechanism of FIGS. 1A-B.
Figure 1D:
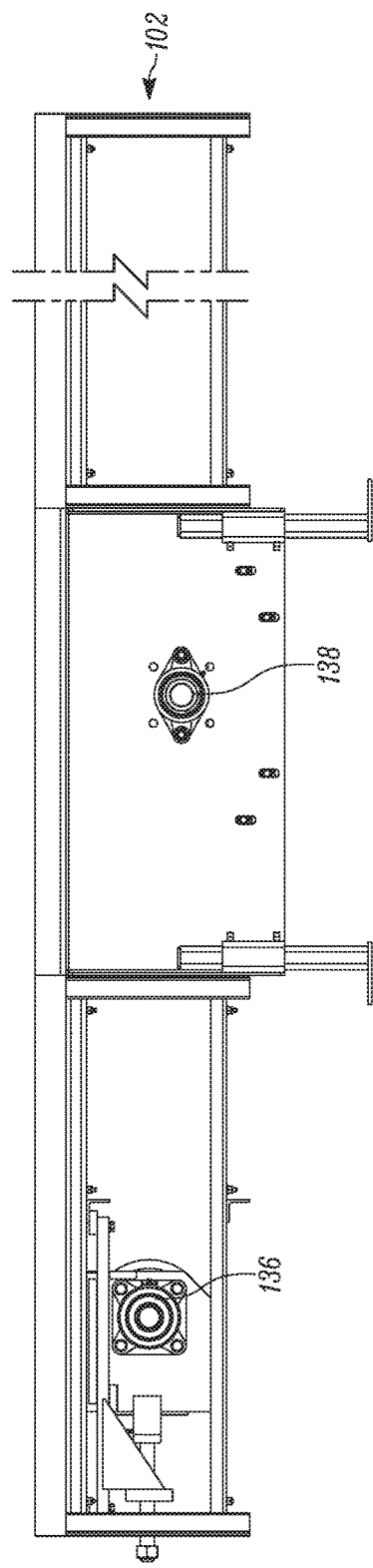
FIG. 1D is a front elevation view of the chain conveyor section or mechanism of FIGS. 1A-C.
Figure 1E:
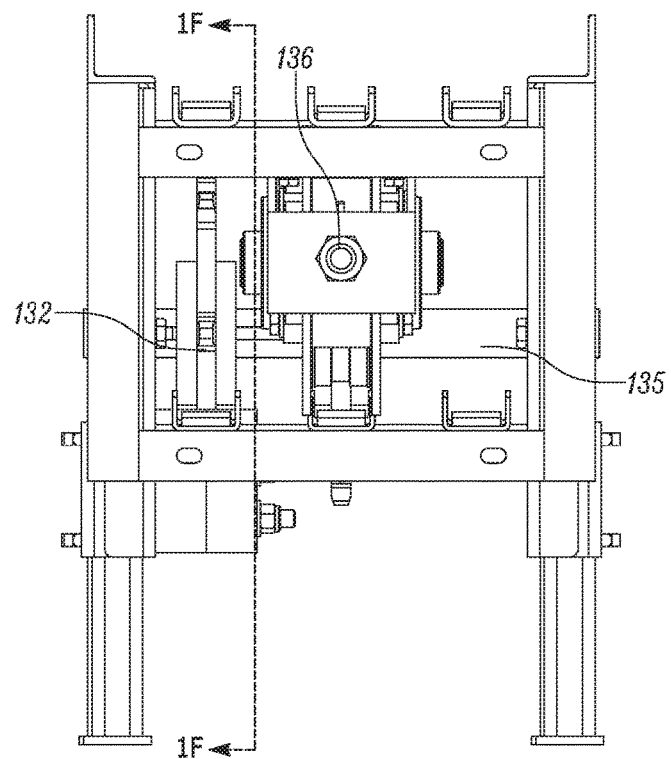
FIG. 1E is a left side elevation view of the chain conveyor section or mechanism of FIGS. 1A-D.
Figure 1F:
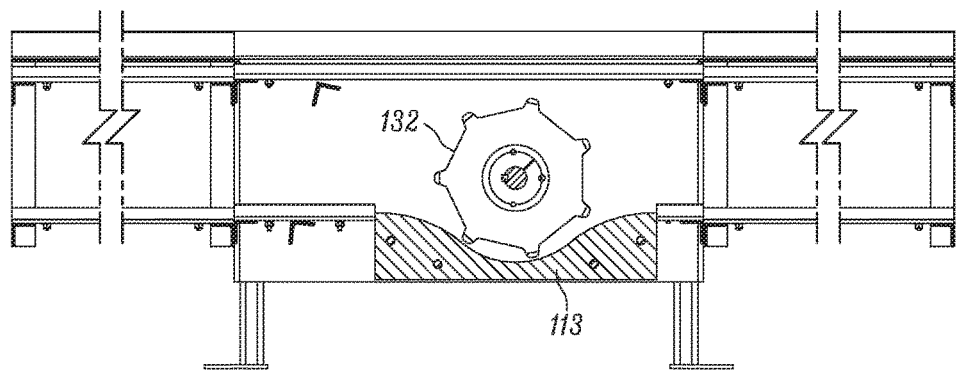
FIG. 1F is a cross-sectional view of the chain conveyor section or mechanism of FIGS. 1A-E taken along the line 1F-1F illustrated in FIG. 1E and using break lines on each side of the chain conveyor section to reduce the size (e.g., width) of the drawing and focus on how the return chain is would be used to drive the auxiliary chain assist drive sprocket.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Many variations of continuous chain conveyors, parts for same (e.g., chain guides, chain drives, etc.), and packaging and handling equipment and systems are discussed herein and even further are contemplated in view of this disclosure. In one form, continuous chain conveyors are discussed herein that are configured, and designed, to utilize existing chain movement to power auxiliary equipment, such as a chain assist drives, thereby, removing the need for some of the equipment that would normally be required for same (e.g., electric motors, drive shafts, gear boxes, etc.). In a more specific example, a continuous chain conveyor component is disclosed herein that is configured and designed to provide auxiliary chains at specific points throughout the chain conveyor system and, in particular, in areas where the system is prone to jams or slowdowns, or where additional assistance is needed. The auxiliary chains are driven by the return portion of one or more of the primary chains.

FIGS. 1A-1G show a chain conveyor 100 according to a first embodiment. The chains are removed for added visibility. The chain conveyor 100 comprises two primary continuous chains that run along a first chain guide channel or path 110 and a second chain guide channel or path 120. The primary chains are driven by one or more primary chain drives having motors operably coupled to the primary chains (e.g., via drive shafts, gearboxes and sprockets). The first and second paths 110/120 extend along multiple frame sections 102. The frame sections 102 have an adjustable height, enabling the same frame sections 102 to be used in multiple applications. The first chain is returned along a first return path 112 and the second chain is returned along a second return path 122. The paths are made of a smooth material in order to reduce friction in the system and a hard material in order to reduce wear. Example materials include many metals, such as steel, or polymers or plastics, such as ultra-high-molecular-weight (UHMW) polyethylene. In alternative embodiments, the number of primary chains varies. For some applications a single primary chain is sufficient, for other applications a plurality of primary chains are needed.

Figure 1G:
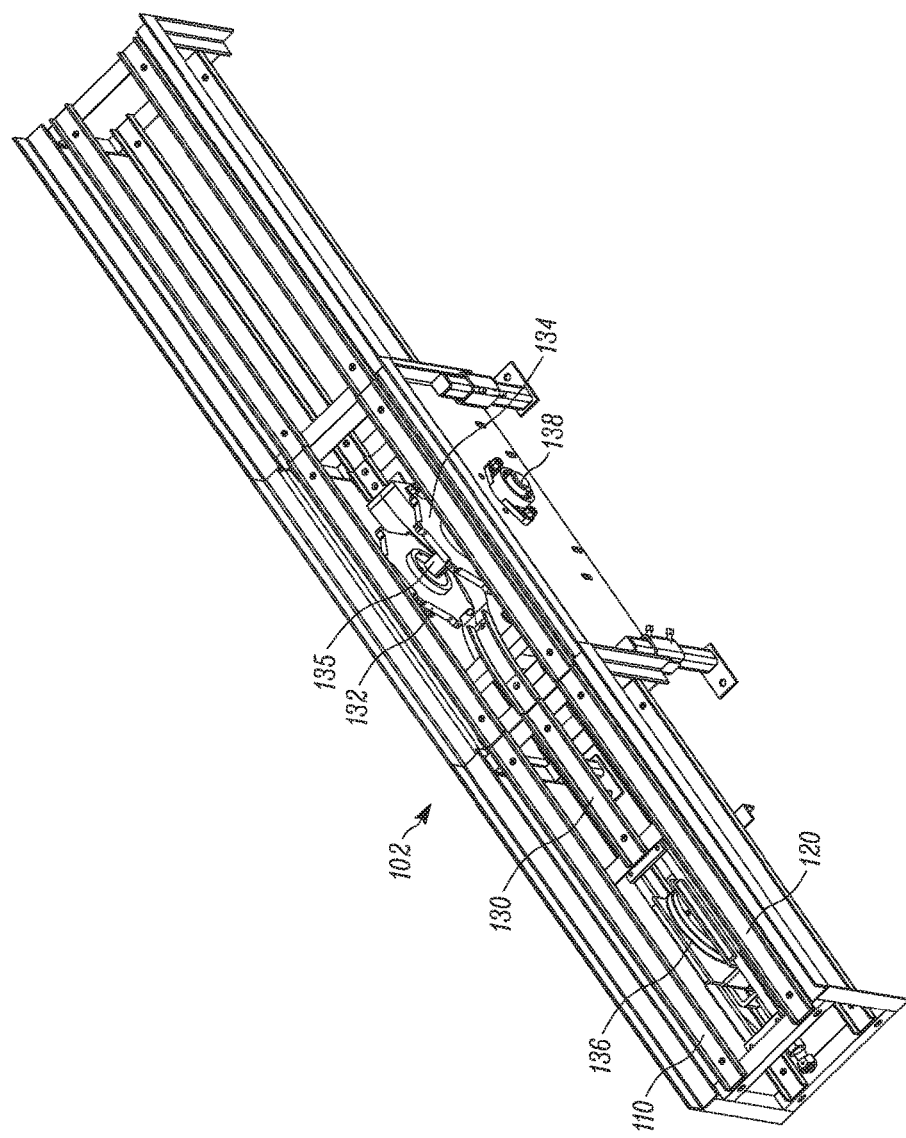
FIG. 1G is an alternate top perspective view (or perspective view taken from above) of the chain conveyor section of FIGS. 1A-F that views the chain conveyor section or mechanism from a position more over the top of the unit to give a clearer view of the lower chain guide channel and the auxiliary chain assist drive sprocket.

The frame sections 102 further contains a third path 130. In this example, the third path 130 guides a center chain used for auxiliary power over short expanses of the chain conveyor 100, however, it should be understood that in alternate embodiments the third path 130 may run any length of the system including the entire length so that it is essentially a third primary chain. As best seen in FIG. 1G, the frame further supports a drive shaft 135. The drive shaft 135 is coupled to the frame section 102 by a bearing 138 such that it is free to rotate. The bearing 138 can be any type of bearing including a ball bearing and a roller bearing. A return sprocket 132 and a drive sprocket 134 are both mounted to the drive shaft 135. The sprockets 132/134 are mounted such that they are prevented from rotating relative to the drive shaft 135. In a preferred embodiment, the return sprocket 132 and/or the drive sprocket 134 are mounted on the drive shaft 135 by a taper lock bushing with a bar or key for locking the sprockets into position with respect to the drive shaft 135 and each other.

Figure 2:
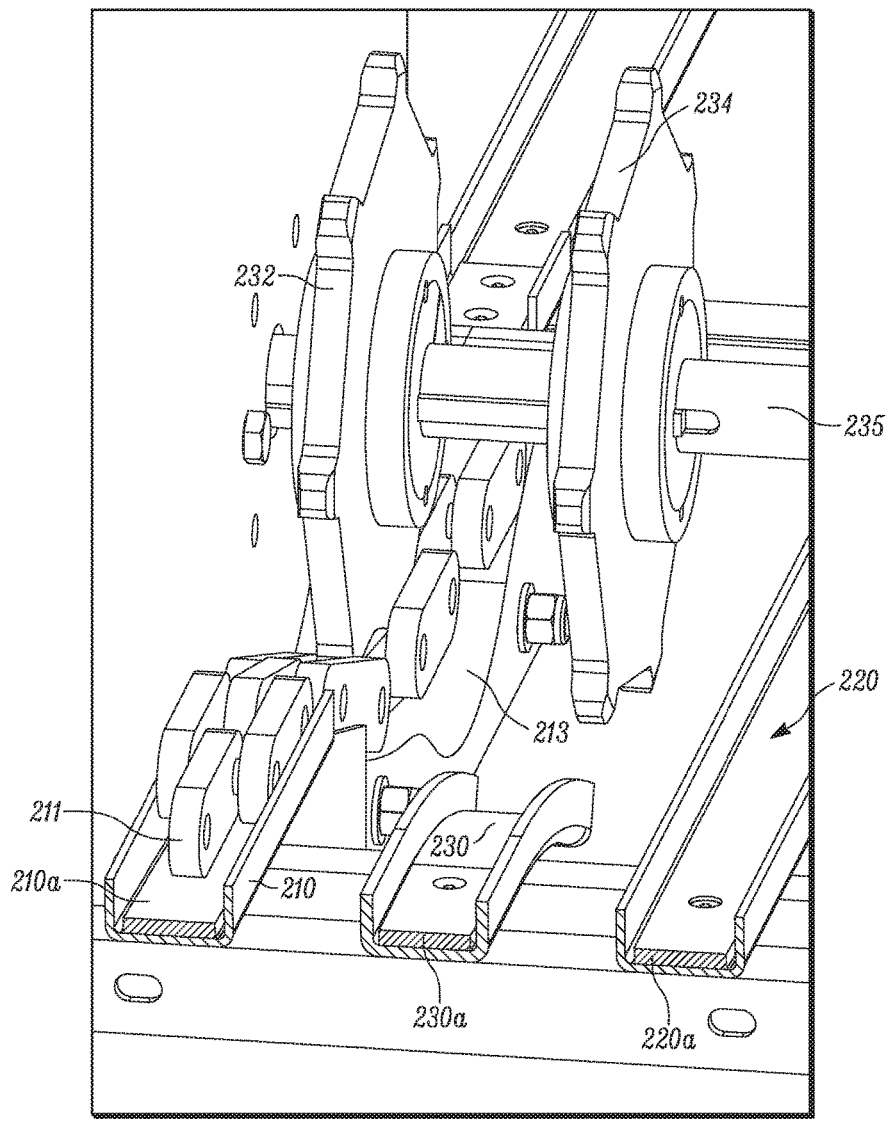
FIG. 2 is an enlarged view of a return chain drive system in accordance with other aspects of the invention and illustrating how a common shaft interconnects the sprocket of the return chain drive on one side of the conveyor assembly to the sprocket of the auxiliary chain assist drive located more centrally within the conveyor assembly.

The return sprocket 132 is located in line with either one of the return paths 112/122. In a preferred embodiment, the return path 112/122 in line with the return sprocket 132 will contain a gap around the return sprocket 132. The tension in the chain causes it to maintain contact with the underside of the return sprocket 132. In the preferred embodiment, the return track 112/122 includes an anti-sag portion 113 extending around the bottom side of the return sprocket 132 in order to hold the chain in engagement with the return sprocket 132 and, preferably, tight to the return sprocket 132 ensure no slippage between the two. In the form illustrated, the anti-sag portion 113 is arc shaped center about the longitudinal axis of the drive shaft 135. This shape maintains a constant distance from the return sprocket 132. As with the paths, the anti-sag portion 113 is made of a hard, smooth material such as ultra-high-molecular-weight (UHMW) polyethylene. This engagement is shown in FIG. 2 with a stretch of chain 211 on the return path 210 in engagement with the return sprocket 232. Items that are similar to those discussed above with respect to FIGS. 1A-G, will use the same latter two-digit reference numerals, but substitute a prefix 2 instead of 1. Thus, the first chain return path, anti-sag portion, return sprocket, drive shaft, chain assist sprocket and center chain path are illustrated in FIG. 2 by reference numerals 212, 213, 232, 234 and 230, respectively, instead of 112, 113, 132, 134 and 130 which they were referred to by in FIGS. 1A-G. In FIG. 2, the first return path 210, center chain path 230 and second return path 220 are illustrated as being lined with a low friction polymer or plastic, such as ultra-high-molecular-weight (UHMW) polyethylene 210a, 230a and 220a, respectively, to reduce the friction of the chain passing through the system. For convenience, the continuous chain 211 is shown in partial view and only in the first return path 210 so that the UHMW liners or sheets 210a, 230a, 220a are visible under chain 211 in return path 210 and in center and second return paths 230 and 220, respectively.

While the embodiments disclosed herein illustrate the sprocket 132 engaging the upper surfaces of the return portion of the primary chain (or return chain), it should be understood that in alternate embodiments, the sprocket 132, 232 may be raised such that it engages the lower surfaces of the primary chain (or chains) traveling through chain channels 110, 120, instead of the return chain. Because of the room the conveyer assembly offers in association with the return chain, and in particular for the anti-sag portion 113, 213, the preferred configuration will be to associate the sprocket 132, 232 with the return chain. For example, the return chain and conveyor assembly provide ample space for the anti-sag portion 113, 213 to be used in connection with the sprocket 132, 232 without interfering with the primary chains ability to carry and deliver product as desired.

Turning back to the embodiment of FIGS. 1A-G, the return chain drives the return sprocket 132 which in turn drives the drive sprocket 134 by turning the drive shaft 135. The drive sprocket 134 engages an auxiliary chain which is positioned in the third track 130. The auxiliary chain only spans the short distance between the drive sprocket 134 and the idler 136. The idler 136 is adjustable so as to alter the distance between the idler 136 and the drive sprocket 134 in order to allow tension on the chain to be adjusted. In some embodiments, the idler 136 is biased away from the drive sprocket 134 so as to keep tension on the auxiliary chain and to keep the auxiliary chain tight. In alternative embodiments, the idler 136 is moved into a position in which the auxiliary chain is tight and then secured in that position. In alternative embodiments, there is a return sprocket 132 on the return portion of each primary chain. The multiple return sprockets can each be placed on the same drive shaft 135 in order to drive the same drive sprocket 134 or can be placed on separate drive shafts 135 in order to drive different drive sprockets 134. When the sprockets 132 and 134 are on the same drive shaft 135, the drive shaft 135 is a motorless drive shaft driven by the return chain of the primary chain and a separate motor and gearbox are not required to drive the auxiliary sprocket 134. Thus, the system 100 requires less components (saving money) and resulting in a more efficient system or process.

In FIGS. 1A-G, the auxiliary chain loops around the idler 136 and the drive sprocket 134 to form a continuous path. The idler 136 and the drive sprocket 134 are both positioned below the surface of the primary chain, so the center path 130 is used to hold the auxiliary chain up into contact with objects traveling along the chain conveyor 100. In alternative embodiments, the drive sprocket 134 is raised such that the auxiliary chain is even with or above the top surface of the drive chain when in engagement with the top of the drive sprocket 134. In alternative embodiments the number of auxiliary chains varies. For some applications, a single auxiliary chain is sufficient. For other applications a plurality of parallel auxiliary chains are needed.

Figure 3:
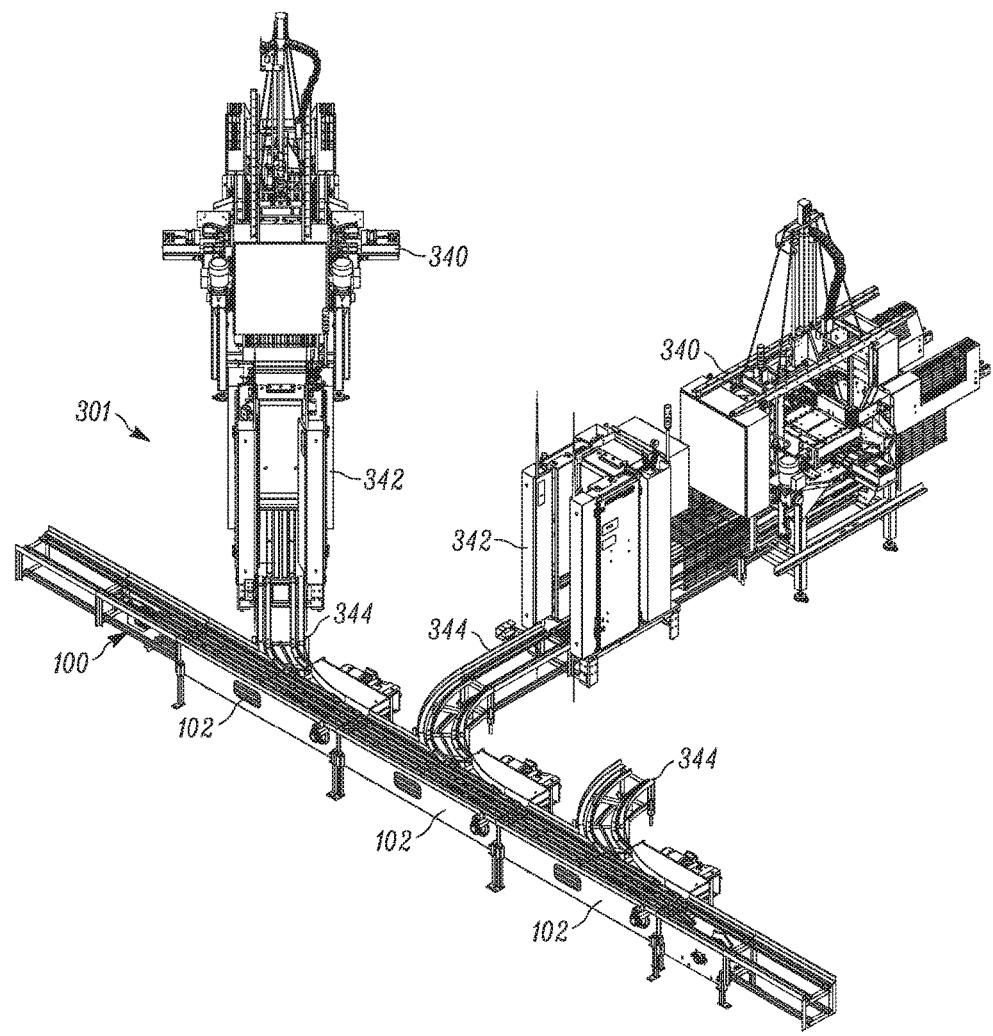
FIG. 3 is a perspective view of an exemplary product packaging and handling line having a caser, stacker, and chain conveyor system with the latter utilizing a return chain drive in accordance with aspects of the invention.

FIG. 3 illustrates a factory line, such as product packaging and handling line 301, having a chain conveyor 100. The factory line 301 can be any of a number of assembly lines, warehouse lines, packaging lines, etc. where objects need to be moved along a set path. Generally chain conveyors are used to move pallets, crates, cases, boxes, or other uniformly sized holders of objects. The factory line 301 in FIG. 3 is a bottle casing line. One or more machines 340 are placed along the line 301. In FIG. 3 the machines 340 are casers which place products, such as milk jugs, into cases. The cases are then stacked by the stackers 342. Once the stack of cases reaches a predetermined height, the stacks are transported down the infeeds 344 to the chain conveyor 100. Several infeeds 344 can be spread along the length of the chain conveyor 100 such that any number of machines 340 can utilize the chain conveyor 100.

In some embodiments, the chain conveyor 100 also has a number of outfeeds configured to remove objects from the chain conveyor 100. Machines or stations with outfeeds and infeeds 344 can be spaced along the chain conveyor 100 to remove a part, perform a step in the manufacturing process, and then return the part to the chain conveyor 100 to be transported to the next machine or station.

Frame sections 102 having the auxiliary chain are placed along the stretches of the chain conveyor 100 having infeeds 344 as infeeds 344 frequently cause jams as a result of the objects or cases entering the chain conveyor 100 at an angle.

Figure 4:
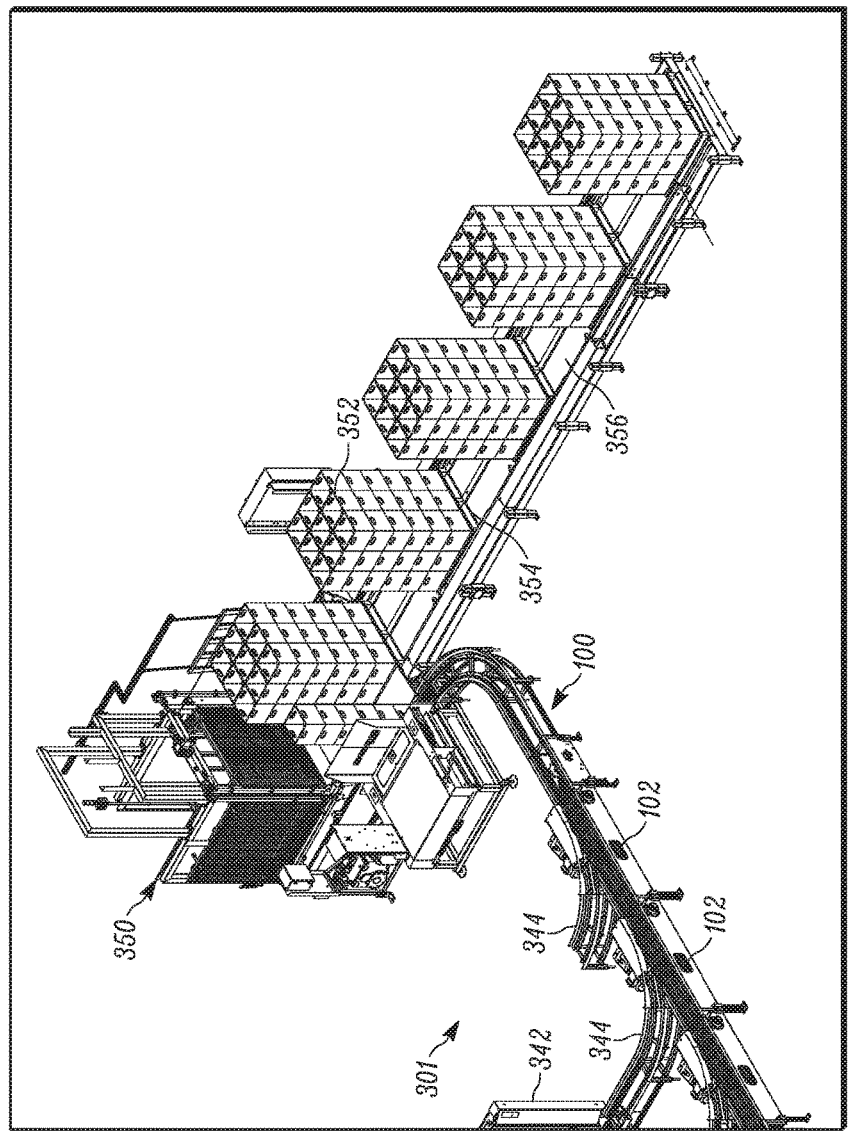
FIG. 4 is a perspective view of an exemplary palletizer for use in the product packaging and handling line of FIG. 3.

In some embodiments, the chain conveyor 100 leads to an additional machine, such as a palletizer 350 (see, FIG. 4) configured to arrange the objects carried by the chain conveyor 100 for shipping. Other machines, such as cart stackers and cart loaders may also be used in connection with system or line 301. The chain conveyor advances cases 352 of products to the palletizer 350. The palletizer 350 then arranges and stacks the cases 352 onto pallets 354. The pallets 354 are advanced from the palletizer 350 by a conveyor 356. In some embodiments, the conveyor 356 is a chain conveyor. In still further embodiments, the conveyor 356 is part of the continuous chain conveyor 100. The pallets 354 of cases 352 of products are ready to be transported. In some embodiments, there is a wrapping machine located after the palletizer 350, or integral with the palletizer 350, which secures the cases 352 together and/or secures the cases 352 to the pallet 354 to reduce the risk of the cases 352 falling off of the pallet 354.

In an alternative embodiment, the auxiliary chain can be selectively engaged and disengaged. A clutch is placed on the drive sprocket 134 or the return sprocket 132 in order to selectively engage them to drive shaft 135. This can reduce the amount of load on the drive motor as only some of the auxiliary chains will be engaged at any given time.

In an alternative embodiment, the auxiliary chain extends the entire length of the chain conveyor 100. The drive motor drives a primary chain and the return chain of the primary chain drives the auxiliary chain as described above. In some embodiments, the auxiliary chain rides along a track that engages the objects along the entire path, such as the second path 120. In other embodiments, the auxiliary chain extends below the surface of the primary chain and is only raised up to contact the objects in areas requiring auxiliary drive.

In alternative embodiments, the auxiliary chain is vertically adjustable to selectively engage the objects on the chain conveyor 100. The idler 136 is movable between a first position in which the auxiliary chain is below the surface of the primary chain and a second position in which the auxiliary chain is even with or above the surface of the primary chain. In a still further alternative the auxiliary chain runs the entire length of the chain conveyor 100 with one or more vertically actuable idlers 136 positioned at possible jam points such that the auxiliary chain can be selectively raised into contact with objects at those points.

Features of the various embodiments described above can be interchanged with each other in any combination to create other embodiments which are contemplated herein. For instance the alternative embodiment with a single primary chain can be combined with alternatives having a plurality of parallel auxiliary chains. Additionally the description of specific chain conveyor frame sections 102 and chain conveyors 100 above enables a person of ordinary skill in the art to make and use those embodiments. Therefor various methods of making and using the above described embodiments are considered herein. For example, methods for powering auxiliary equipment using existing conveyor system components are contemplated herein, as are methods of manufacturing and assembling product packaging and handling equipment. Other contemplated methods include methods for maintaining engagement between a chain and drive sprocket (e.g., anti-sag portion 113, 213, etc.), and methods for driving an auxiliary chain drive sprocket and methods for providing a motorless drive shaft.

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A chain conveyor comprising:
   a primary continuous chain having a first portion configured to carry objects along a path and a return portion, wherein the primary continuous chain has a length that extends an entire length of the chain conveyor;
   a motor operably coupled to the primary continuous chain so as to induce movement of the primary continuous chain;
   a first sprocket engaging the return portion of the primary continuous chain, wherein movement of the return portion causes the first sprocket to rotate;
   a second sprocket coupled to the first sprocket by a drive shaft, wherein rotation of the first sprocket causes the second sprocket to rotate; and
   an auxiliary chain operably coupled to the second sprocket such that rotation of the second sprocket causes movement of the auxiliary chain, wherein the auxiliary chain has a length that is less than the length of the primary continuous chain.

2. The chain conveyor of claim 1 further comprising a first guide engaging the primary continuous chain and a second guide engaging the auxiliary chain.

3. The chain conveyor of claim 2 wherein the first guide and the second guide are formed of ultra-high-molecular-weight polyethylene.

4. The chain conveyor of claim 1 further comprising a second primary continuous chain having a first portion configured to carry objects along a path and a return portion, wherein the second primary continuous chain has a length that extends the entire length of the chain conveyor, and wherein the auxiliary chain is positioned between the primary continuous chain and the second primary continuous chain.

5. The chain conveyor of claim 4 wherein the second primary continuous chain is operably coupled to the motor.

6. The chain conveyor of claim 1, wherein a first end of the auxiliary chain engages the second sprocket and a second end of the auxiliary chain engages an idler, wherein the idler keeps tension in the auxiliary chain.

7. A chain drive comprising:
a continuous chain having a primary chain portion upon which product is rested and by which the product is transported, the primary chain portion traveling from a first end of the continuous chain to a second end of the continuous chain, and the continuous chain further having a return chain portion that returns the continuous chain from the second end to the first end below a plane containing the primary chain portion;
a drive sprocket connected to a drive shaft and positioned proximate the return chain portion so that the return chain portion engages and drives the drive sprocket thereby rotating the drive shaft connected to the drive sprocket to provide power to an auxiliary chain drive comprising an auxiliary chain sprocket connected to the drive shaft and an auxiliary chain positioned proximate the auxiliary chain sprocket so that the auxiliary chain sprocket engages and drives the auxiliary chain, wherein the auxiliary chain has a length that is less than a length of the primary chain.

8. The chain drive of claim 7 further comprising an anti-sag chain guide that has a curved surface facing the drive sprocket along which the return chain portion of the continuous chain travels, the curved surface maintaining a constant distance from the drive sprocket in order to assist in forming a secured engagement between the return chain portion of the continuous chain and the drive sprocket.

9. The chain drive of claim 7, wherein a first end of the auxiliary chain engages the auxiliary chain sprocket and a second end of the auxiliary chain engages an idler, wherein the idler keeps tension in the auxiliary chain.

10. A method of moving objects comprising:
providing a chain conveyor comprising:
a primary continuous chain having a first portion configured to carry objects along a path and a return portion, wherein the primary continuous chain has a length that extends an entire length of the chain conveyor;
a motor operably coupled to the primary continuous chain so as to induce movement of the primary continuous chain;
a first sprocket engaging the return portion of the primary continuous chain, wherein movement of the return portion causes the first sprocket to rotate;
a second sprocket coupled to the first sprocket by a drive shaft, wherein rotation of the first sprocket causes the second sprocket to rotate; and
an auxiliary chain operably coupled to the second sprocket such that rotation of the second sprocket causes movement of the auxiliary chain, wherein the auxiliary chain has a length that is less than the length of the primary continuous chain;
placing objects on the primary continuous chain;
operating the motor to move the primary continuous chain in a movement direction; and
contacting the objects with the auxiliary chain such that the auxiliary chain exerts a force on the objects in the movement direction.

11. The method of claim 10 further comprising:
providing a second primary continuous chain, the second primary continuous chain being operably coupled to the motor, wherein the second primary continuous chain has a length that extends the entire length of the chain conveyor, and wherein the auxiliary chain is positioned between the primary continuous chain and the second primary continuous chain;
operating the motor to move the second primary continuous chain in the movement direction; and
contacting the objects with the second primary continuous chain such that the second primary auxiliary continuous chain exerts a force on the objects in the movement direction.

* * * * *